May 26, 1964  KOJI MATSUMURA  3,134,343

VEHICLE FOR ROAD AND RAILROAD

Filed March 2, 1961

INVENTOR.
Koji Matsumura
BY
ATTORNEYS

# United States Patent Office 3,134,343
Patented May 26, 1964

3,134,343
VEHICLE FOR ROAD AND RAILROAD
Koji Matsumura, Hiroshima, Japan, assignor to Toyo Kogyo Company Limited, Hiroshima-ken, Japan, a company of Japan
Filed Mar. 2, 1961, Ser. No. 92,918
Claims priority, application Japan Mar. 14, 1960
3 Claims. (Cl. 105—215)

The present invention relates generally to a vehicle capable of being operated both on road and railroad.

An object of the invention is to provide a vehicle capable of being operated freely both on road and railroad by simple and effective means of new and improved operating apparatus.

Another object of this invention is to absorb the vibrations or shock arising both in road driving and railroad driving using a simple absorber.

A further object of this invention is to make rear rail wheels of the vehicle liftable by means of a propeller shaft consisting of a spline inserted so as to be elongated or retracted longitudinally permitting the vehicle to be driven with its road wheels without being obstructed by said rear rail wheels.

Other objects and advantages of this invention will become apparent in the following description and from the accompanying drawings, in which.

Figure 1:
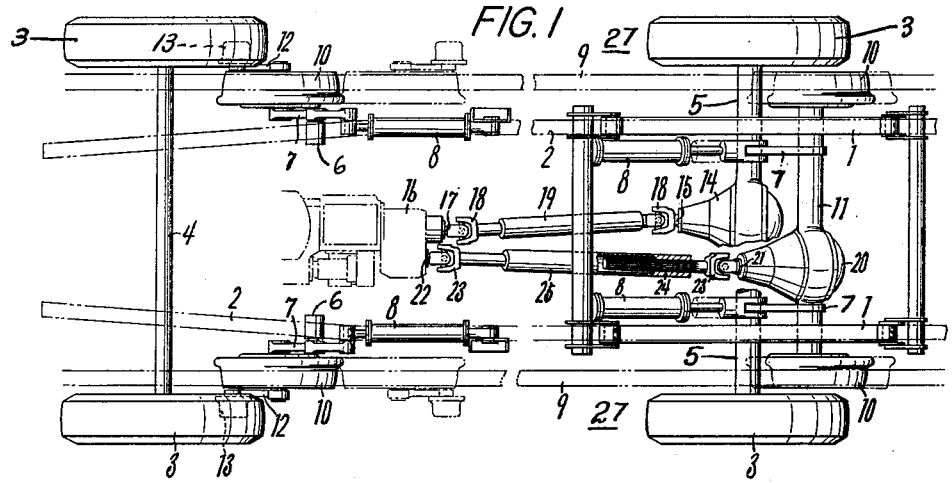
FIG. 1 is a plane view embodying the features of this invention.

In the embodiment of the invention illustrated in the accompanying drawings road wheel axle 4 and road wheel axle casing 5 bearing road wheels 3 are suspended from chassis 2 through suspension springs 1. Front rail wheels 10 are rotatably mounted on the lower end of front bell cranks 7 and said bell cranks are rotatably connected to chassis 2 by link shafts 6 at the middle of the bell cranks 7 and also are connected pivotally to hydraulic hoists 8 at their upper ends. Rolls 13 are mounted on arms 12 which are connected to the axle of front rail wheels 10 and project well forward of pivots 6 so as to make said rolls 13 press against the under surface of road wheels 3 when the vehicle is driven on rails. Rear rail wheels 10 are rotatably mounted on rail wheel axle casing 11 which is mounted on rear bell cranks 7 and these bell cranks are connected rotatably to road wheel axle casing 5 at their middle portion and also are pivotally connected to hydraulic hoists 8 at their upper ends.

The driving power from engine 16 is transmitted to rear road wheels 3 through drive shaft 15 of differential gear 14 and main transmission shaft 17, both of which are connected to propeller shaft 19 by means of universal joints 18, and the driving power to rear rail wheels 10 is transmitted through drive shaft 21 of reducing gear 20 and transmission shaft 22, and both of which are connected to propeller shaft 25 by means of universal joints 23. In this case the driving power will be distributed alternatively to each driving member from a single engine by means of an apparatus provided therein. Propeller shaft 25 has a hollow internally splined shell into which spline 24 is inserted in order to permit transmitting of drive power and longitudinal extending or retracting movement to allow the rear rail wheels to be lifted up or lowered.

In arranging the vehicle for running on rails, the front bell cranks 7 bearing the front rail wheels are swung down together with the rolls 13 around the fulcrum of the link shafts 6 by contracting movement of the front hydraulic hoists 8 setting the front rail wheels on rails 9 and pressing the rolls 13 against the road wheels 3, while the rear bell cranks 7 bearing the rail wheel axle casing 11 are also swung down around the fulcrum of road wheel axle casing 5 by expanding movement of the rear hydraulic hoists 8 setting the rear rail wheels on to rails 9 causing propeller shaft 25 to be retracted. Further feeding of hydraulic pressure into the hoists 8 lifts the vehicle up until its road wheels 3 leave the ground 27 and the vehicle is supported by rail wheels and bell cranks, thereby permitting the vehicle to run on rails on rail wheels 10. The rolls 13 are forced firmly against the front road wheels 3 by the pressure in the hoists 8.

Figure 2:
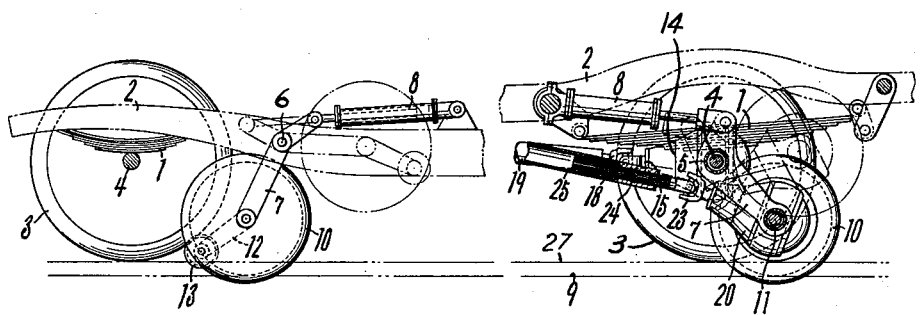
FIG. 2 is a side elevational view.

In returning to the road driving, the contrary operation of the hoists 8 to that above described withdraws the rail wheels to positions as shown in FIG. 2 with chain lines. During the swinging up of the rear bell cranks 7 together with rear rail wheels, the propeller shaft 25 is expanded, and its universal joint 23 allows said rail wheels to be raised further forming an angle at said universal joint in order to raise the rail wheels sufficiently to pass above the road, and thus the vehicle is permitted to run on land 27.

According to this invention the vibrations or shocks occurring in road driving are absorbed through the suspension spring 1, while in rail driving the rolls 13, which are at the end of arms 12, are forced firmly against the front road wheels 3 and the upward movement of the rail wheel causes pivoting of arm 7 around pivot 6 to transmit the vibrations or shocks from the front rail wheels to the road wheel axle 4 through the road wheels 3 and they are absorbed by the suspension spring 1. On the other hand the vibrations or shocks which arise at rear rail wheels are absorbed through the bell cranks 7, road axle casing 5 and suspension spring 1.

If desired the front bell cranks 7 for suspending the front rail wheels may be connected rotatably to the road wheel axle 4 instead of constructing manner shown in the accompanying drawings, then vibrations or shocks propagated from the front rail wheels is absorbed simply through the road wheel axle 4 and suspension spring 1, or in construction shown in accompanying drawings the rolls 13 may be mounted so as to be forced to the road wheel axle 4 directly then the vibrations or shocks will be transmitted to said axle 4 directly and absorbed by the spring 1, in this case necessary provisions will also be installed in order to make said rolls 13 and its arms 12 dodged from being obstructive or road driving.

Figure 3:
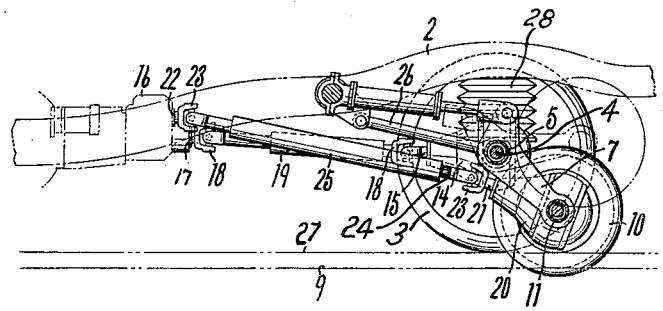
FIG. 3 is a side elevation view similar to FIG. 2 of the rear part of the vehicle showing a modification where an air suspension spring is used instead of a leaf spring.

When desired the leaf springs 1 may be replaced by air springs 28 (FIG. 3) or coil springs (not shown in the drawings) to function as vibration or shock absorbers, in this case the axle or axle casing of the road wheels will be connected to the chassis 2 with rods 26 and drivings will be transmitted to the chassis 2 through said rods 26.

The present invention is by no means limited to the particular construction shown in the drawings but also embraces any modifications within the scope of the appended claims.

It will be apparent from the foregoing that this invention provides the serviceable and useful vehicles which promote efficiency greatly in transportation, moreover according to its very simple construction it will be operated easily, highly effiicently with accuracy and also provided at a low cost for such peculiar vehicles.

Having thus described my invention, what I claim:

1. A combined road and rail vehicle, comprising a frame, a front and rear wheel axle resiliently mounted on said frame, road wheels at the opposite ends of each of said axles, said rear road wheel axle having a differential therein, a drive shaft having universal joints at each end thereof having one end connected to said differential for driving said rear road wheel axle, four bell cranks pivotally mounted relative to said frame adjacent said road wheels, a rail wheel rotatably mounted on one end of each of the bell cranks adjacent the front wheel axle, a crank rotating means connected to the other end of each bell crank for rotating said bell cranks to raise and lower said rail wheels, a rear rail wheel axle between the bell cranks adjacent the rear road wheels and having rail wheels on opposite ends thereof, a reducing gear in said rear rail wheel axle, an extensible drive shaft having universal joints at each end thereof having one end connected to said reducing gear for driving said rear rail wheel axle, said extensible drive shaft having a splined shaft and an internally splined sleeve in which said splined shaft is slidable, a change-over gear means connected to the other ends of said drive shaft and said extensible drive shaft, a further arm on the end of each of the bell cranks adjacent the front road wheels, an auxiliary wheel on the end of each further arm, said auxiliary wheels bearing against the bottom portion of the front road wheels when the front bell cranks are in the position with the front rail wheels lowered for transmitting shocks to said frame through said front road wheels and the resilient mounting of said front road wheel axle.

2. A combined road and rail vehicle as claimed in claim 1 in which said bell cranks on which said rear rail wheel axle is mounted are pivotally mounted on said rear road wheel axle.

3. A combined road and rail vehicle, comprising a frame, a front and a rear road wheel axle resiliently mounted on said frame, road wheels at the opposite ends of each of said axles, said rear road wheel axle having a differential therein, a drive shaft having universal joints at each end thereof having one end connected to said differential for driving said rear road wheel axle, four bell cranks, two pivotally mounted on said frame adjacent said front road wheel axle and two piovtally mounted on said rear road wheel axle, a front rail wheel rotatably mounted on the end of each of the two bell cranks adjacent the front road wheel axle, a rear rail wheel axle between the two bell cranks on the rear road wheel axle, a rail wheel rotatably mounted on each end of said rear rail wheel axle, a crank rotating means connected to the other end of each bell crank for rotating said bell cranks to raise and lower said rail wheels, a reducing gear in said rear rail wheel axle, an extensible drive shaft having universal joints at each end thereof having one end connected to said reducing gear for driving said rear rail wheel axle, said extensible drive shaft having a splined shaft and an internally splined sleeve in which said splined shaft is slidable, and a changeover gear means connected to the other ends of said drive shaft and said extensible drive shaft.

References Cited in the file of this patent
UNITED STATES PATENTS

| | | |
|---|---|---|
| 2,088,522 | Klima | July 27, 1937 |
| 2,140,421 | Fageol | Dec. 13, 1938 |
| 2,478,647 | Watts et al. | Aug. 9, 1949 |
| 2,655,873 | McDonald | Oct. 20, 1953 |